(12) United States Patent
Prasser et al.

(10) Patent No.: US 12,643,444 B2
(45) Date of Patent: Jun. 2, 2026

(54) AUTOMOBILE SEAT COVERING SYSTEM

(71) Applicants:Stephen Prasser, Buderim (AU); Joan Prasser, Buderim (AU)

(72) Inventors: Stephen Prasser, Buderim (AU); Joan Prasser, Buderim (AU)

( * ) Notice: Subject to any disclaimer, the term of this patent is extended or adjusted under 35 U.S.C. 154(b) by 208 days.

(21) Appl. No.: 18/294,714

(22) PCT Filed: Oct. 12, 2022

(86) PCT No.: PCT/AU2022/051226
§ 371 (c)(1),
(2) Date: Feb. 2, 2024

(87) PCT Pub. No.: WO2023/060307
PCT Pub. Date: Apr. 20, 2023

(65) Prior Publication Data
US 2024/0336177 A1 Oct. 10, 2024

(30) Foreign Application Priority Data

Oct. 12, 2021 (AU) ................................. 2021903274

(51) Int. Cl.
B60N 2/60 (2006.01)
B60R 11/00 (2006.01)
(52) U.S. Cl.
CPC ............ B60N 2/6036 (2013.01); B60R 11/00 (2013.01); *B60R 2011/0017* (2013.01); *B60R 2011/0077* (2013.01)
(58) Field of Classification Search
CPC ......... A47C 1/10; B60N 2/6036; B60R 11/00; B60R 2011/0017; B60R 2011/0077
(Continued)

(56) References Cited

U.S. PATENT DOCUMENTS 2,536,592 A * 1/1951 Wiederhold ......... B60N 2/6027
297/396
5,234,252 A * 8/1993 Wallach ............... B60N 2/6036
297/229

(Continued)

FOREIGN PATENT DOCUMENTS

CN 207345574 U * 5/2018
JP H09238785 A * 9/1997
JP 3138727 U 1/2008

OTHER PUBLICATIONS

Australian International Type Search Report dated Mar. 17, 2022 from AU Application No. 2021903274, 13 pages.
(Continued)

*Primary Examiner* — Jose V Chen
(74) *Attorney, Agent, or Firm* — INNOVATION CAPITAL LAW GROUP, LLP; Vic Lin

(57) ABSTRACT

An automobile seat covering system has a cover sheet, a pouch configured for stowing the cover sheet and a headrest harness configured for attaching to a headrest. An attachment between the harness and the pouch is configured to allow the pouch to move relative to the harness to allow the pouch to transition over the headrest between front and rear surfaces of the headrest whilst the harness remains in place affixed to the headrest. As such, the pouch with cover sheet folded therein can be stored behind the seat, preferably across a rear surface of the headrest. When required for use the pouch can be easily moved over the top of the headrest so that attachment hangs the pouch across the front surface of the headrest without having to move or reconfigure the harness, thereby allowing the harness to remain securely affixed to the headrest.

20 Claims, 10 Drawing Sheets

(58) Field of Classification Search
USPC ........................................................ 297/221
See application file for complete search history.

(56) References Cited

U.S. PATENT DOCUMENTS

| | | | | |
|---|---|---|---|---|
| 6,393,638 | B1 | 5/2002 | Maccoll | |
| 6,786,547 | B1 * | 9/2004 | Chu ........................ | B60N 2/879 297/217.3 |
| 7,172,246 | B1 * | 2/2007 | Itakura ................. | A47C 31/116 297/452.47 |
| 9,402,484 | B2 * | 8/2016 | Moore ................... | A47C 31/11 |
| 10,293,724 | B1 * | 5/2019 | McFarlane ............... | A45C 9/00 |
| 12,024,129 | B1 * | 7/2024 | Hsu ......................... | B60R 7/043 |
| 2002/0135911 | A1 * | 9/2002 | Glasow ................. | B60N 2/879 359/838 |
| 2004/0144817 | A1 * | 7/2004 | Albert ................... | B60N 2/879 224/275 |
| 2010/0140994 | A1 * | 6/2010 | Moore ................... | A47C 31/11 297/229 |
| 2016/0129819 | A1 | 5/2016 | Johnson, Jr. et al. | |
| 2019/0270412 | A1 * | 9/2019 | Kyle ........................ | B60N 2/90 |
| 2020/0039401 | A1 * | 2/2020 | Mestroni ............. | B60N 2/6036 |
| 2022/0388451 | A1 * | 12/2022 | Beenen ................... | B60R 7/043 |

OTHER PUBLICATIONS

International Search Report & Written Opinion dated Jan. 16, 2023 from PCT Application No. PCT/AU2022/051226, 8 pages.

* cited by examiner

AUTOMOBILE SEAT COVERING SYSTEM

FIELD OF THE INVENTION

This invention relates generally to coverings for automobile seats.

BACKGROUND OF THE INVENTION

US 20200039401 A1 (Mestroni et al.) 6 Feb. 2020 discloses an automobile seat cover system which comprises a dispenser which attaches behind a headrest and which contains a roll of disposable cover pads, each of which can be unrolled in turn to cover the vehicle seat and subsequently discarded.

US 20160129819 A1 (Johnson) 12 May 2016 discloses an alternative arrangement wherein an antimicrobial seat cover can be retained within a bag attached from a headrest. The bag may either be attached to headrest posts as is shown in FIG. 1A of Johnson or alternatively comprises an integrally formed hood which surrounds the headrest as is shown in FIG. 1B of Johnson. When not in use, the bag can be swung around the headrest as is shown in FIG. 3 of Johnson.

JP 3138727 U (Igarashi) 17 Jan. 2008 discloses a yet further seat cover arrangement which can also be used as an apron.

The present invention seeks to provide automobile seat covering system, which will overcome or substantially ameliorate at least some of the deficiencies of the prior art, or to at least provide an alternative.

It is to be understood that, if any prior art information is referred to herein, such reference does not constitute an admission that the information forms part of the common general knowledge in the art, in Australia or any other country.

SUMMARY OF THE DISCLOSURE

There is provided herein an automobile seat covering system comprising a cover sheet, a pouch configured for stowing the cover sheet and a headrest harness configured for attaching to a headrest.

The system comprises an attachment between the harness and the pouch.

The attachment is configured to allow the pouch to move relative to the harness to allow the pouch to transition over the headrest between front and rear surfaces of the headrest whilst the harness remains statically affixed to the headrest.

As such, the pouch with cover sheet folded therein can be stored behind the seat, preferably across a rear surface of the headrest.

When required for use however, the pouch can be easily moved over the top of the headrest so that attachment hangs the pouch across the front surface of the headrest without having to move or reconfigure the harness, thereby allowing the harness to remain securely affixed to the headrest.

The cover sheet can then be unfolded from the pouch and which hangs down from the pouch to cover the seat. With the cover sheet removed, the pouch collapses flat, thereby ergonomically interfacing the contours of the seat.

Other aspects of the invention are also disclosed.

BRIEF DESCRIPTION OF THE DRAWINGS

Notwithstanding any other forms which may fall within the scope of the present invention, preferred embodiments of the disclosure will now be described, by way of example only, with reference to the accompanying drawings in which.

DESCRIPTION OF EMBODIMENTS

Figures 1, 2:
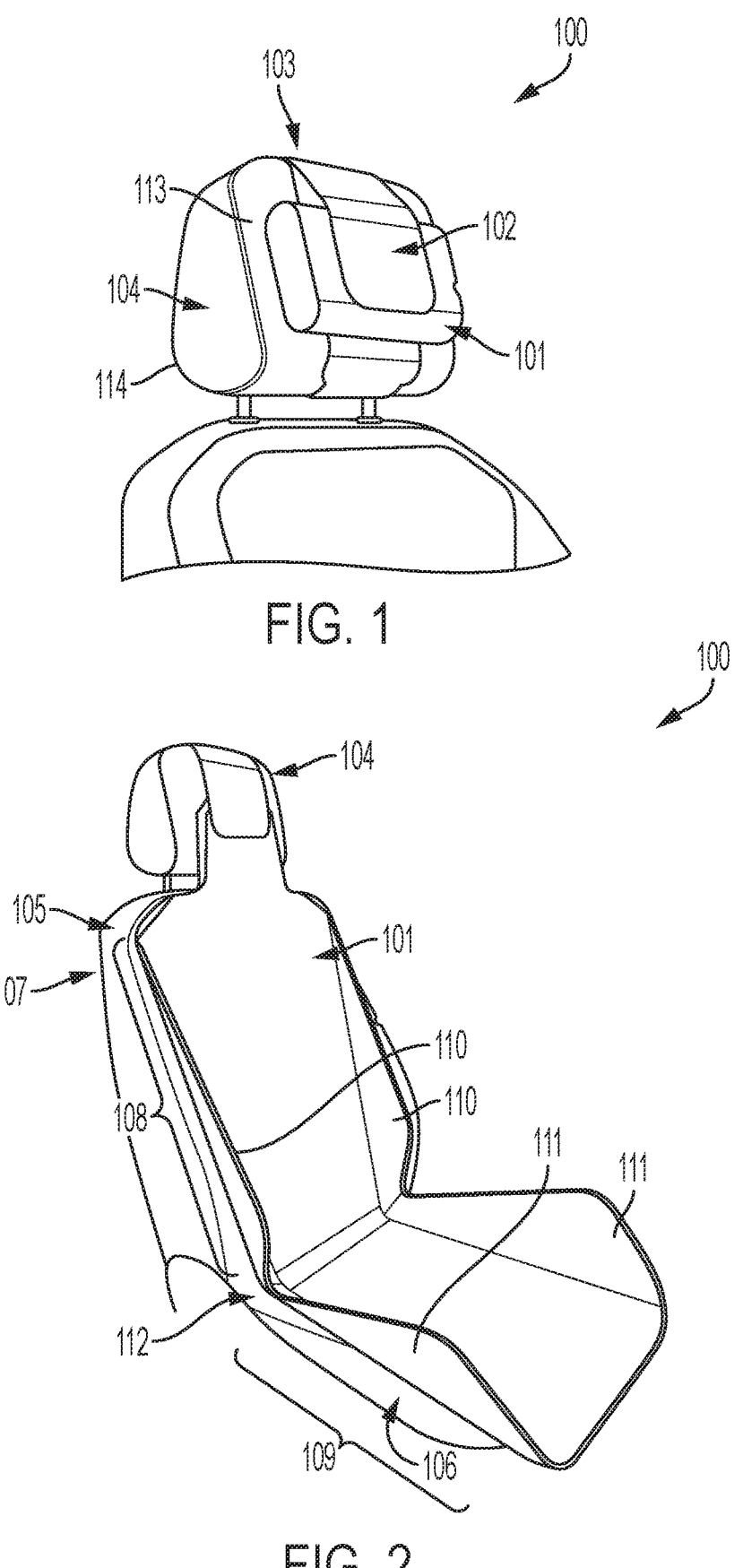
FIG. 1 shows an automobile seat covering system wherein a cover sheet thereof is folded up within a pouch attached to a headrest of a vehicle seat.
FIG. 2 shows the system of FIG. 1 wherein the cover sheet is unfolded.

An automobile seat covering system 100 comprises a cover sheet 101, a pouch 102 configured for stowing the cover sheet 101 and a headrest harness 103 configured for attaching to a headrest 104.

FIG. 1 shows wherein the cover sheet 101 is folded away and stowed by the pouch 102. FIG. 2 shows wherein the cover sheet 101 is unfolded and hangs down from the headrest 104 to cover the back 105 and the base 106 of a vehicle seat 107.

The cover sheet 101 may be cut and formed to comprise a seat back covering portion 108 and a seat base covering portion 109.

The seat back covering portion 108 may comprise side wing portions 110 configured to fold against and/or around sides of the back 105 of the seat 107. Similarly, the seat base covering portion 109 may comprise side wing portions 111 configured to fold against and/or around sides of the base 106.

The cover sheet 101 may have a transition 112 between the seat back covering portion 108 and the seat base covering portion 109 which narrows and/or is devoid of side wings 110, 111.

Figure 4:
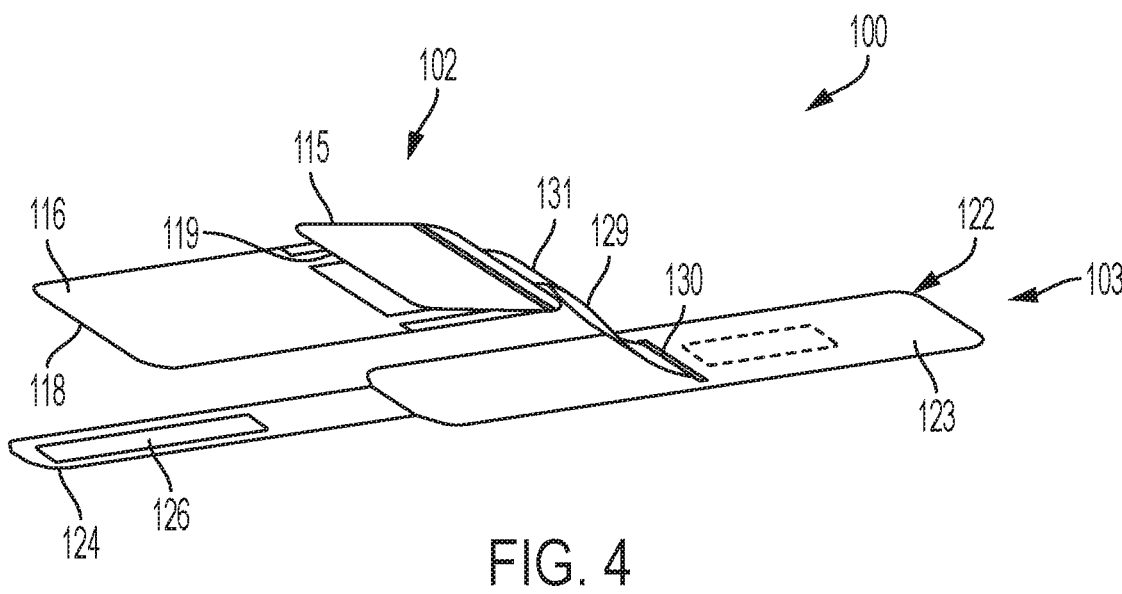
FIG. 4 shows a perspective view of the system of FIG. 3.
Figure 5:
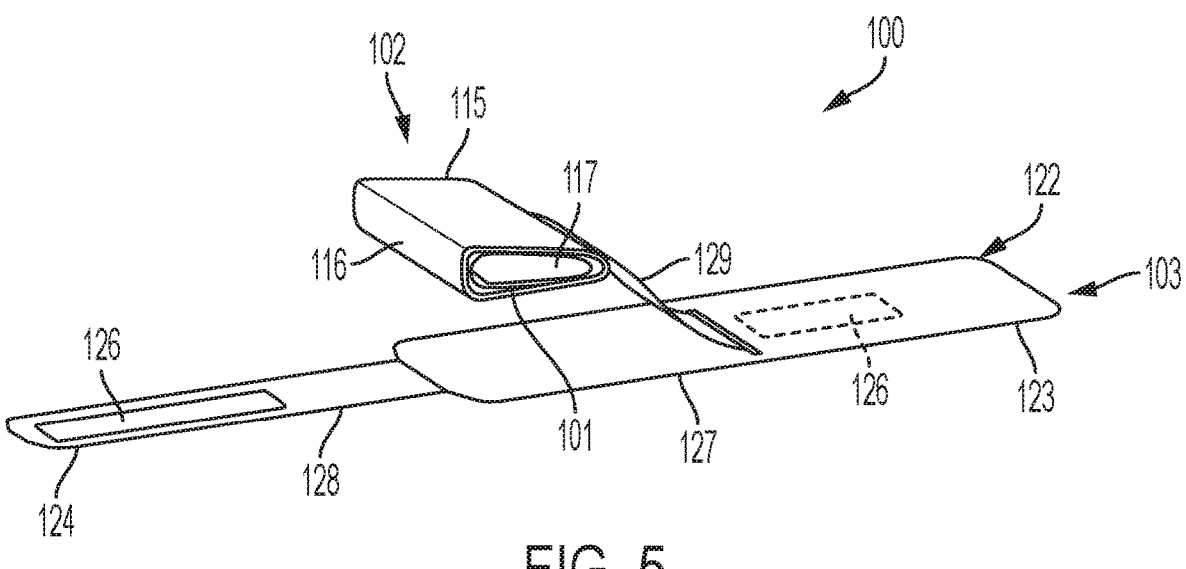
FIG. 5 shows the system of FIG. 4 with the cover sheet folded up within the pouch.
Figure 9:
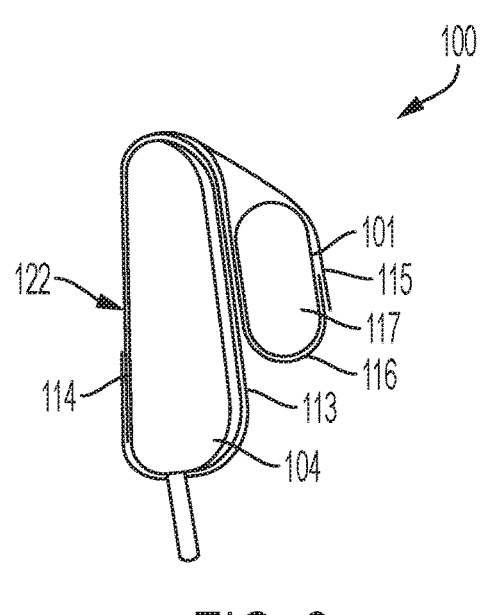
FIG. 9 shows a side view of the arrangement of FIG. 8.
Figure 20:
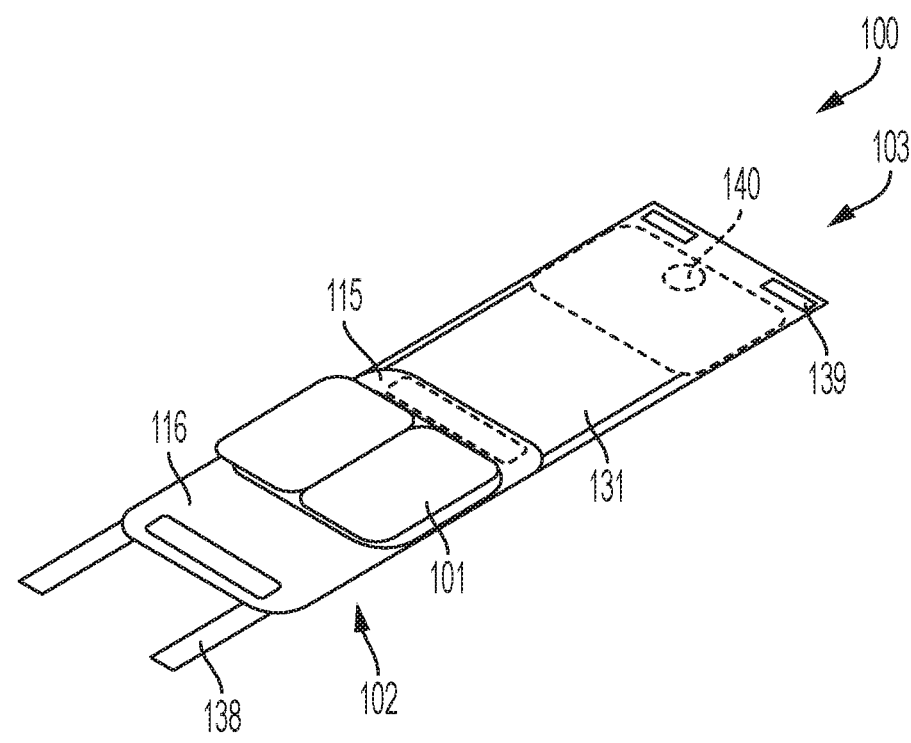
FIGS. 20 and 21 show further version of the second embodiment.

FIG. 4 shows an embodiment wherein the pouch 102 is formed by a cover flap 115 and the relatively longer backing 116 which folds against the flap 115 in the manner shown in FIG. 5 to define a pocket 117 therebetween for the cover sheet 101. With reference to the orientation shown in FIG. 4, an undersurface of an edge 118 may comprise fasteners (such as for hook or loop fasteners) which attach to an undersurface of a corresponding edge 119 of the cover flap 115 (such as wherein the cover flap 115 comprises corresponding for hook or loop fasteners). This type of arrangement is also shown in FIG. 9. FIG. 20 shows an embodiment wherein the longer backing 116 folds over the cover flap 115.

Figure 6:
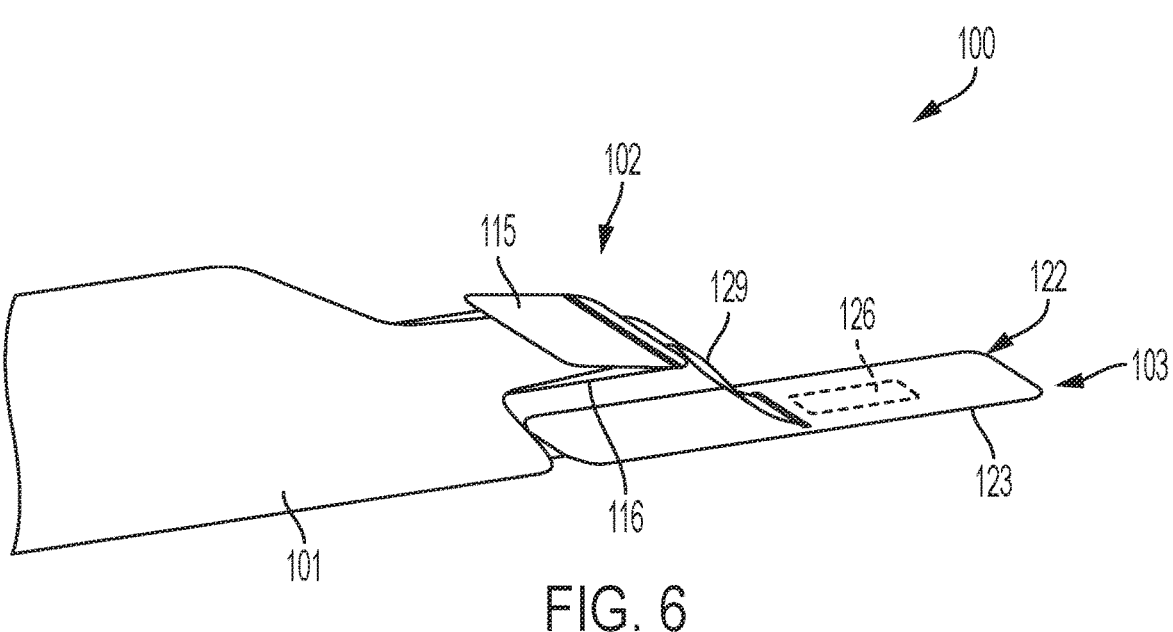
FIG. 6 shows the system of FIG. 4 with the cover sheet unfolded from the pouch.

FIG. 6 shows wherein the cover flap 115 and the backing 116 can be pulled apart to deploy the cover sheet 104 from the pouch 102.

Figure 17:
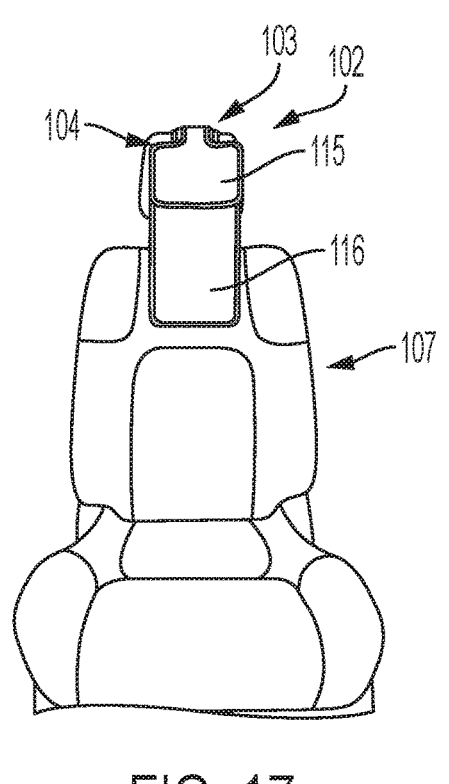

As shown in FIG. 17, when the pouch 103 is positioned across the front surface 113 of the headrest 104, the cover flap 115 may be above the backing 106 which hangs down in front of the back 107, thereby allowing the cover sheet 101 to be easily folded out from the pouch 102 or folded up into the pouch 102.

Figure 23:
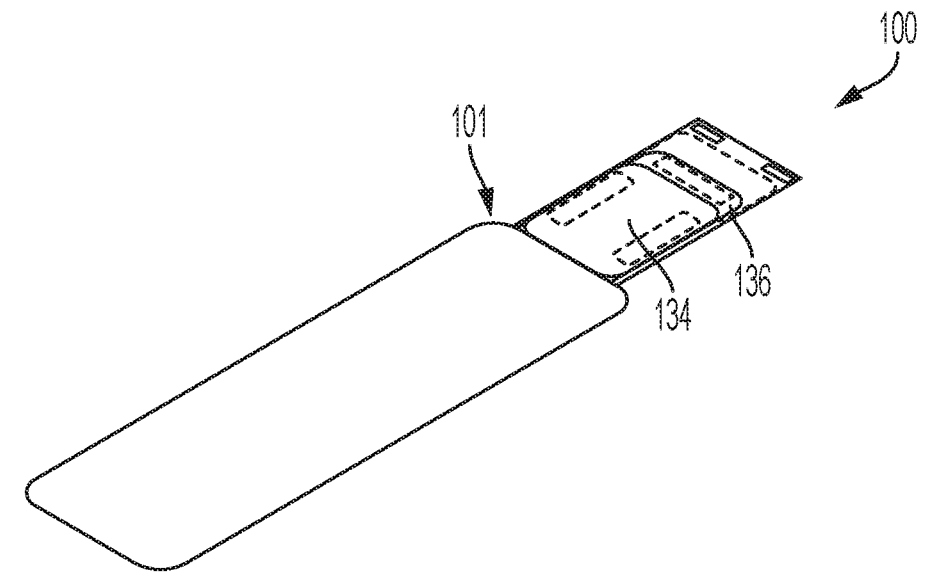

In embodiments, the cover sheet 101 may be removably attachable from the pouch 102. FIG. 23 shows wherein the cover sheet 101 comprises an attachable portion 134 comprising fastener pads 135 which attach to corresponding fastener pads of a corresponding attachment portion 136 of the pouch 102. As such, the cover sheet 101 may be removed from the pouch 102 whilst the pods 102 is attached to headrest 104 in the manner shown in FIG. 17.

Figures 18A, 18B, 18C, 19:
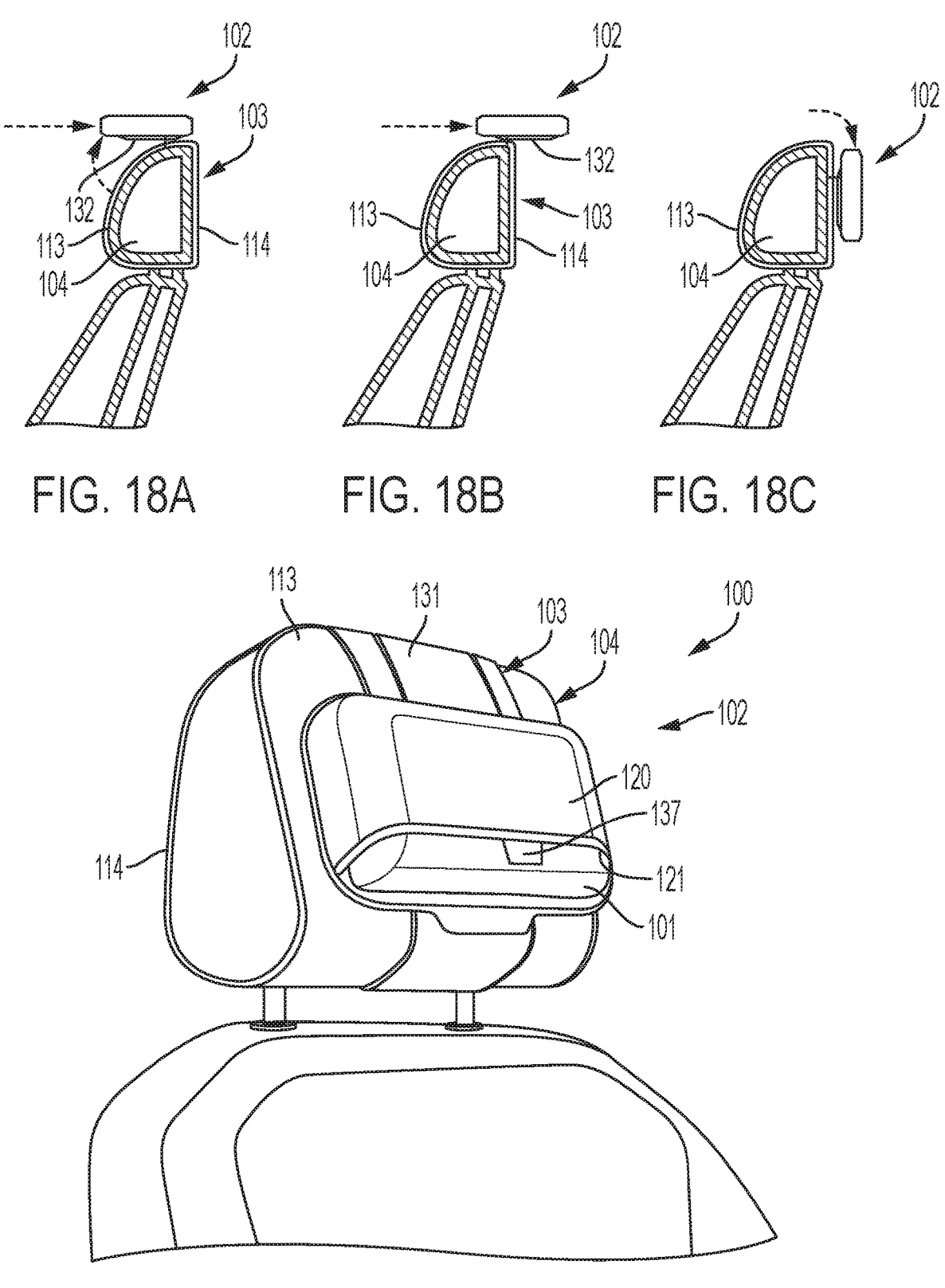
FIGS. 18a-c shows a second embodiment wherein the system has an attachment allowing the pouch to slide across the top of the headrest.
FIG. 19 shows a version of the second embodiment.

FIG. 19 shows an alternative embodiment wherein the pouch 102 comprises a purse 120 sealed at three edges to define the pocket 117 therein and which defines an opening 121 from which the cover sheet 101 is accessible.

When the purse 120 is suspended across the front surface 113 of the headrest 104, the opening 121 is preferably downwardly orientated so that the cover sheet 101 can be conveniently pulled therefrom to hang from the pouch 102. As is shown in FIG. 19, the cover sheet 101 may comprise a pull tab 137.

Figures 7, 8:
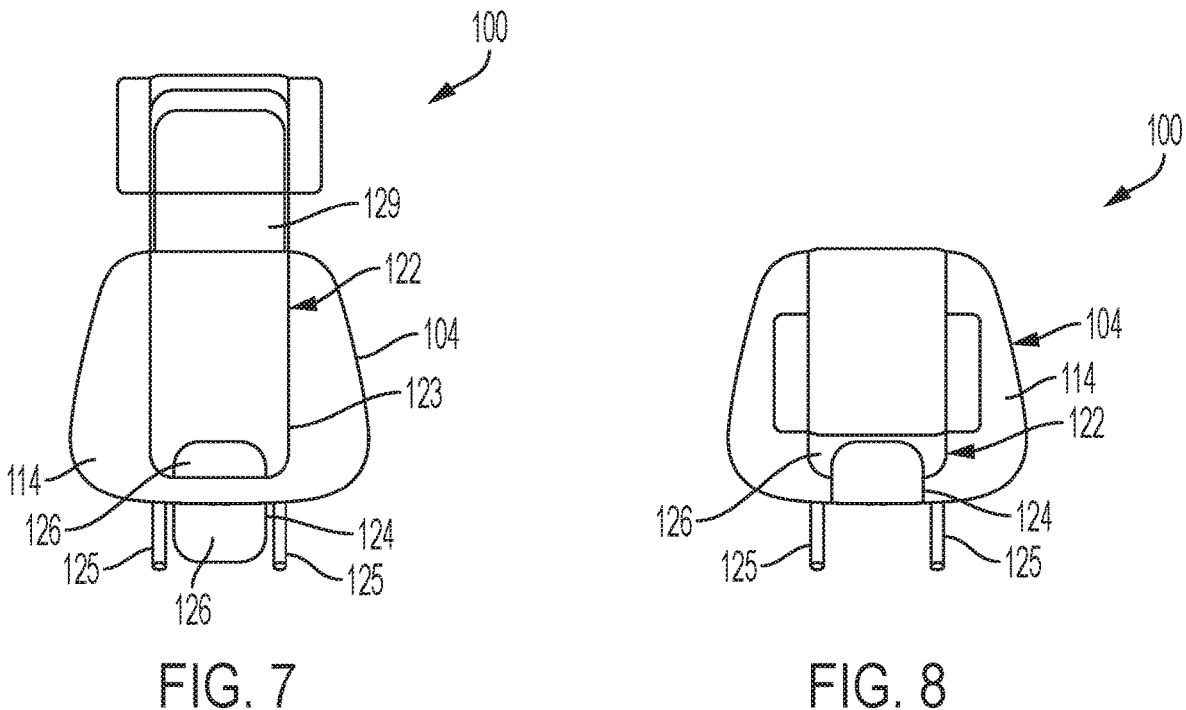
FIG. 7 shows a rear of the headrest illustrating how the harness attaches to the headrest in an embodiment.
FIG. 8 shows the rear of the headrest illustrating the harness attached to the headrest.

FIG. 5 shows a preferred embodiment wherein the headrest harness comprises a band 122 having ends 123, 124 attachable together to loop the band over the headrest 104 in the manner shown in FIGS. 7 and 8.

More specifically, FIG. 7 shows wherein the band 122 is placed over the headrest 104 with a first end 123 placed against the rear surface 114 of the headrest 114 and a second end 124 placed between securement posts 125 of the headrest 104. The ends 123, 124 may comprise fastener pads 126 (such as hook and loop fastener pads) which attach when the second end 124 is wrapped over the first end in the manner shown in FIG. 8.

FIG. 5 illustrates wherein the band 122 comprises a wide band portion 127 which primarily goes over the top of the headrest 104 and a narrow band portion 128 which primarily goes under the headrest 104. The narrow band portion 128 may be sufficiently narrow to fit between the posts 105 in the manner shown in FIG. 7.

FIG. 5 also shows wherein the fastener pads 126 run longitudinally along their respective ends 123, 124 so that the band 122 can adjust to variably sized headrests 104.

Figure 22:
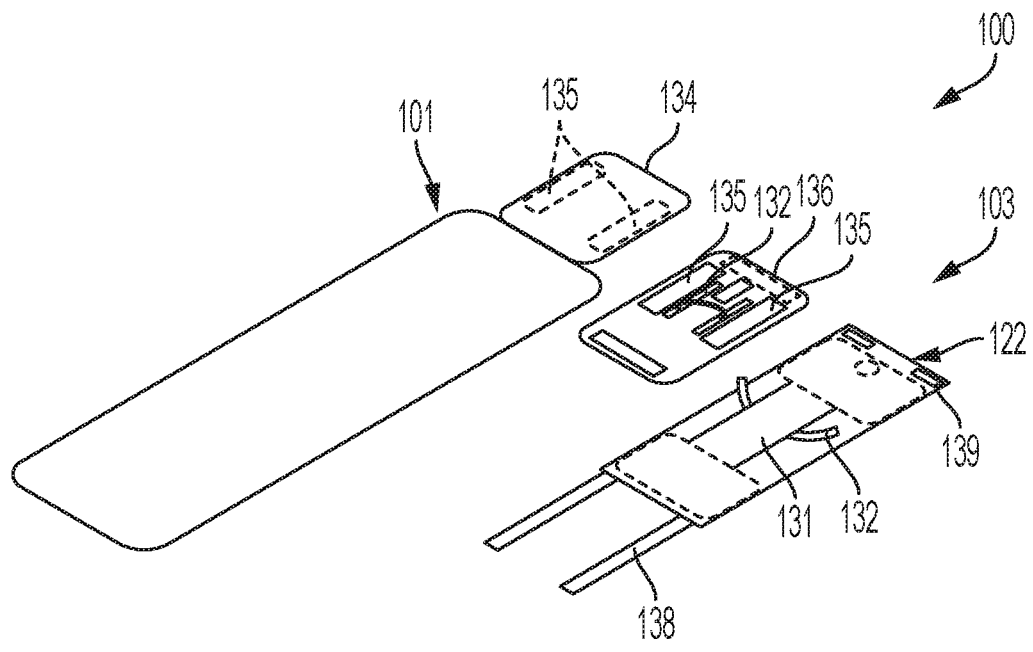
FIGS. 22 and 23 show a yet further version of the second embodiment.

FIG. 22 shows an alternative embodiment wherein the ends of the band 123 are secured using straps 138 which feed back through respective apertures 139.

The system 100 further comprises an attachment configured to allow the pouch 102 to transition over the headrest 104 between the front surface 113 and the rear surface 114 thereof whilst the harness 103 remains statically affixed to the headrest 104 (i.e. without moving the harness 103 or requiring repositioning of the harness 103).

FIG. 3 shows a first embodiment wherein the attachment is configured to allow the pouch 102 to flip over the headrest 104 whilst the harness 103 remains statically attached to the headrest 104.

FIG. 18 shows a second embodiment wherein the attachment is configured to allow the pouch 102 to slide over the headrest 104.

FIG. 24 shows a further embodiment wherein the attachment is configured to allow the pouch 102 to retract over the headrest 104.

With regards to the first embodiment, and further with reference to FIG. 4, the attachment comprises a retainer web 129. The retainer web 129 has a proximal end 130 attached from the harness 103 and a distal end 101 attached from the pouch 102. The retainer web 129 preferably takes the form of a strap.

As is shown in FIG. 3, the retainer web 129 is configurable to allow the pouch 102 to be conveniently flipped over the headrest 104 in use whilst the harness 103 remains statically affixed to the headrest 104.

The harness 103 is preferably configured to secure the proximal end 130 of the retainer web 129 from the top of the headrest 104 so that the pouch 102 can flip over the headrest 104 generally equidistantly either side thereof.

Figures 3A, 3B, 3C:
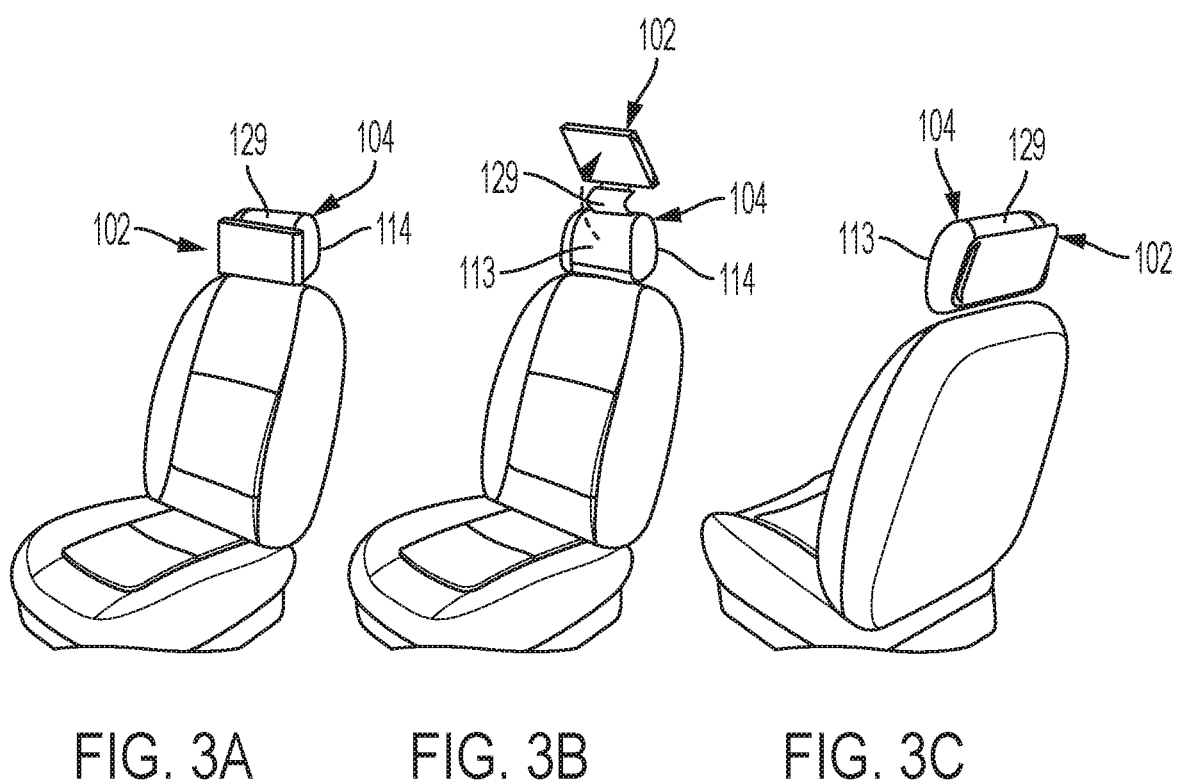
FIG. 3 shows an embodiment wherein the system comprises an attachment allowing the pouch to flip over the top of the headrest whilst the harness remains statically affixed to the headrest.

The length of the retainer web 129 may be configured so that, as is shown in FIG. 3, the retainer web 129 hangs the pouch 102 across the front surface 113 of the headrest 104. As is further shown in FIG. 3c, the retainer web 129 may hang the pouch 102 across the rear surface 114 of the headrest 104.

FIGS. 10-16 illustrates the deployment of the cover sheet according to the first embodiment.

Figure 10:
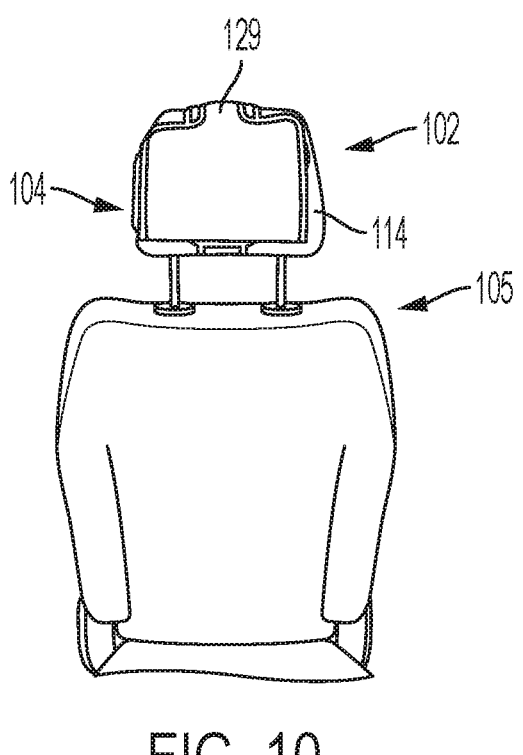
FIGS. 10-17 illustrate the use of the of the first embodiment.

FIG. 10 shows a rear of the seat 105 wherein the retainer web 129 hangs the pouch 102 from the rear surface of the headrest 104. The cover sheet 101 is folded up within the pouch 102.

Figure 11:
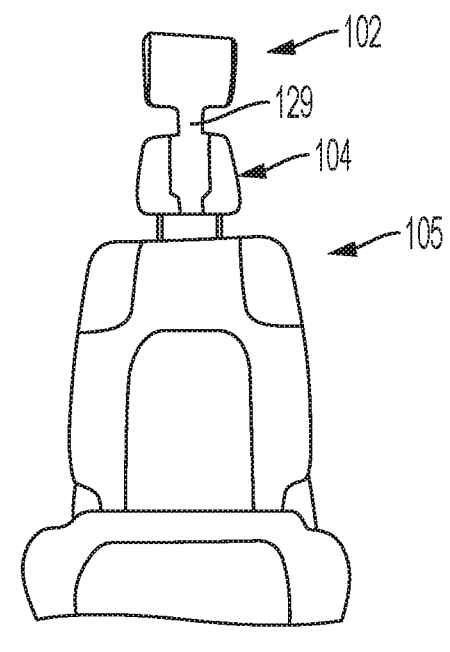

FIG. 11 shows the front of the seat 105 and wherein the pouch 102 is flipped over the headrest 104 by the retainer web 129 without moving the harness 103.

Figure 12:
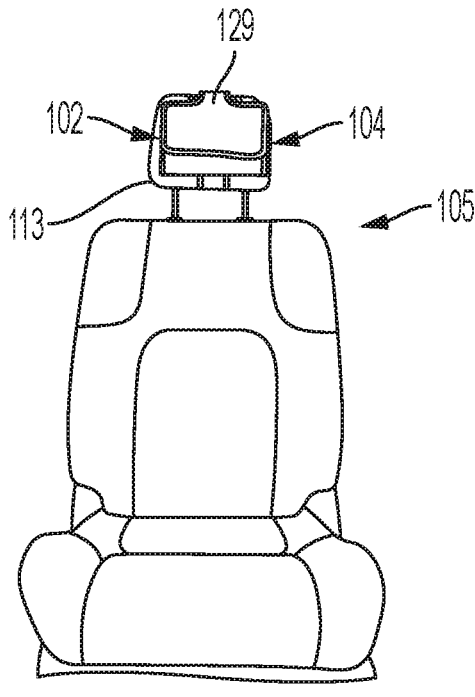

As such, FIG. 12 shows wherein the retainer web 129 hangs the pouch 102 across the front surface 113 of the headrest 104.

Figure 13:
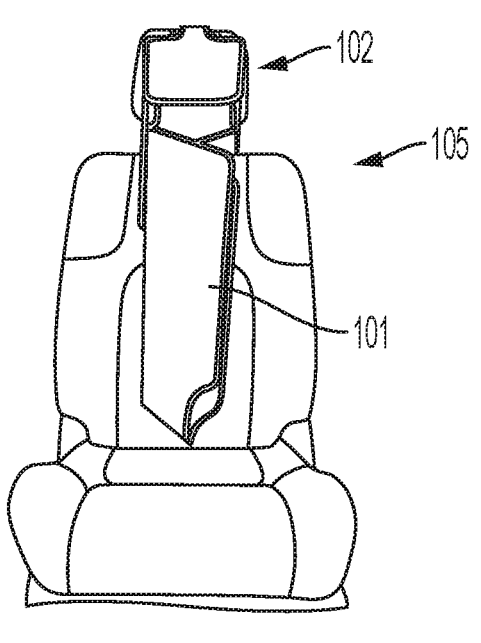

FIG. 13 shows wherein the edges 118, 119 of the backing 116 and cover flap 115 respectively are pulled apart so that the cover sheet 101 falls from the pouch 102 across the seat 105. As is illustrated in FIG. 13, the cover sheet 101 may be initially folded longitudinally and with the seat base covering portion 109 folded against the seat back covering portion 108.

Figure 14:
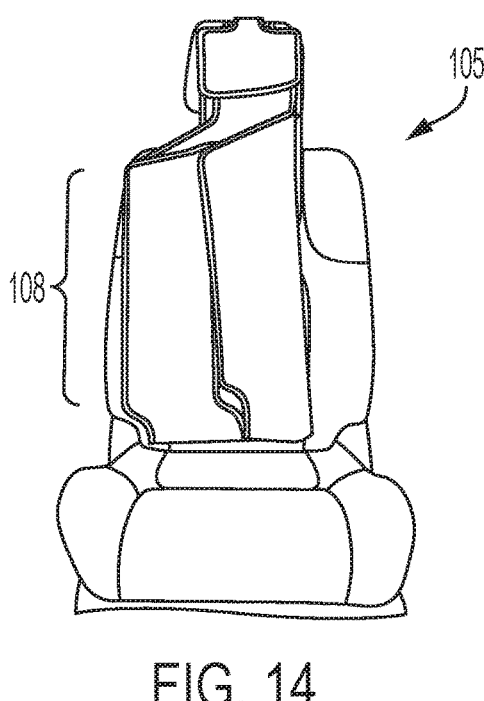
Figure 15:
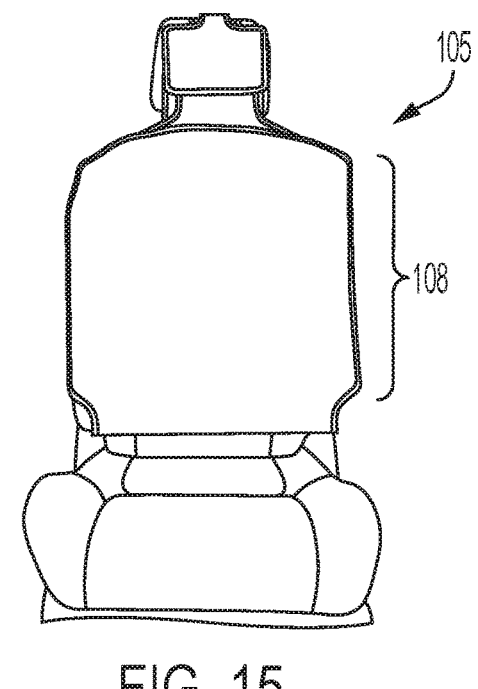

FIGS. 14 and 15 shows wherein the sides of the seat back covering portion 108 are folded out in turn to cover the back 107 of the seat 105.

Figure 16:
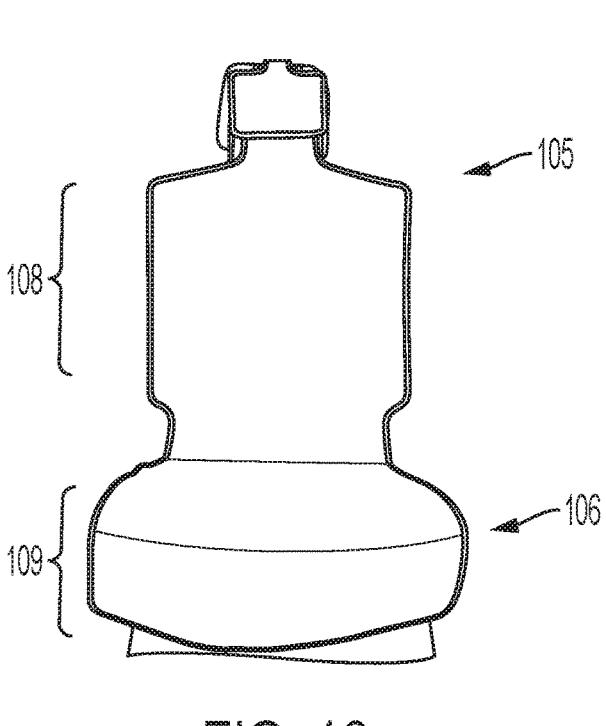

FIG. 16 shows further wherein the seat base covering portion 109 is unfolded to cover the base 106 of the seat 105.

FIG. 17 shows wherein the cover sheet 101 may be detached from the pouch 102 for cleaning or the like wherein the pouch 102 remains attach the headrest 104 by the harness 103. As is further shown in FIG. 7, the backing 116 may hang detached from the cover flap 115 across the back 107 of the seat.

According to the second embodiment shown in FIGS. 18 and 19, the attachment is configured to allow the pouch 102 to slide with respect to the harness 103 between the front surface 113 and the rear surface 114 thereof. In accordance with the second embodiment, the attachment may comprise a slider band 131 held by the harness 103 to extend over the address 104 between the front surface 113 and the rear surface 114 thereof. As is shown in FIG. 9, the slider band 113 may be held relatively taught by the harness 103 over the headrest 104.

The pouch 102 further comprises an engagement 132 configured to slidably engage the slider band 131 so that the pouch 102 can slide between the front and rear surfaces 113, 114 while the harness 103 remains statically affixed to the headrest 104.

Figure 21:
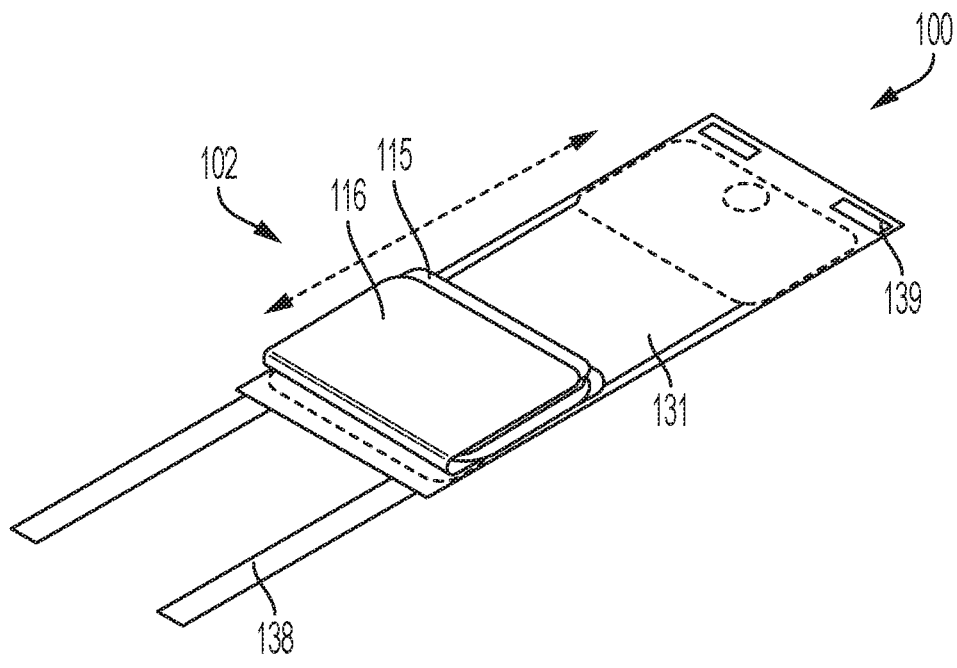

FIGS. 20 and 21 shows wherein the slider band 131 is relatively wide and FIG. 22 shows wherein the slider band 131 is relatively narrow with respect to the band 122 of the harness 103.

FIG. 22 further shows wherein the system 100 comprises a loop 132 engaging the pouch 102 to the slider band 131.

Figures 24A, 24B:
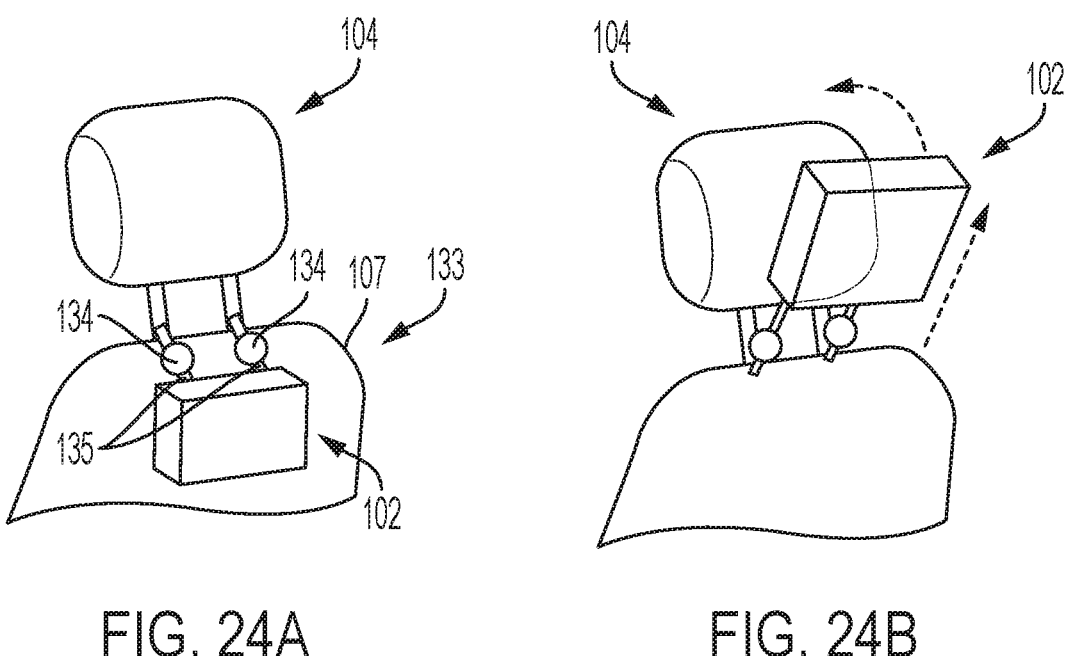
FIGS. 24a-c show the system according to a third embodiment.

With reference to the third embodiment, FIG. 24 shows wherein the attachment comprises a retraction mechanism 133 between the headrest 104 and the pouch 102. As is shown FIG. 24a, the retraction mechanism 133 may retract to hand the pouch 102 form the back 107 of the seat 102. However, FIGS. 24b and c illustrate how the retraction mechanism 133 can be pulled to allow the pouch 102 to go over the headrest 104.

According to the embodiment shown in FIGS. 24a and b, the retraction mechanism 133 comprises a pair of coiled spring devices 130 for which spool respect of webs.

Figure 24C:
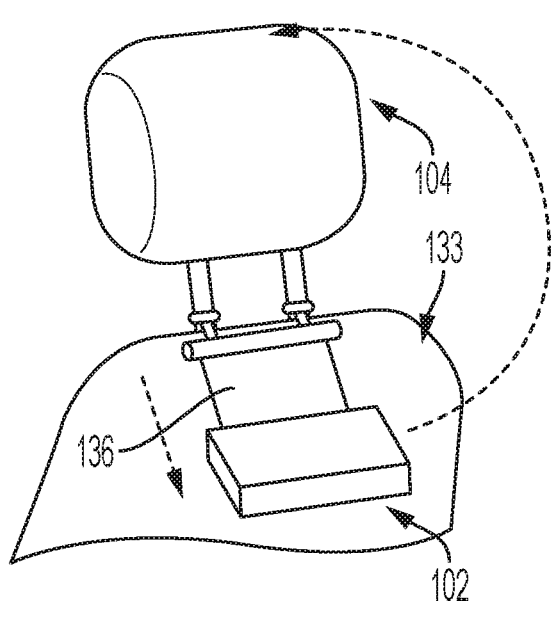

Alternatively, FIG. 24c shows wherein the retraction mechanism 133 comprises a coiled spring mechanism which spools a sheet 136.

The system 100 may comprise a fastener to hold the part 103 against the rear surface 114 of the headrest 104. With reference to FIG. 20, the harness 103 may comprise a magnet 140 stitch therein which magnetically attracts a corresponding magnet of the pouch 102.

The foregoing description, for purposes of explanation, used specific nomenclature to provide a thorough understanding of the invention. However, it will be apparent to one skilled in the art that specific details are not required in order to practise the invention. Thus, the foregoing descriptions of specific embodiments of the invention are presented for purposes of illustration and description. They are not intended to be exhaustive or to limit the invention to the precise forms disclosed as obviously many modifications and variations are possible in view of the above teachings. The embodiments were chosen and described in order to best explain the principles of the invention and its practical applications, thereby enabling others skilled in the art to best utilize the invention and various embodiments with various modifications as are suited to the particular use contemplated. It is intended that the following claims and their equivalents define the scope of the invention.

The invention claimed is:

1. An automobile seat covering system comprising a cover sheet, a pouch configured for stowing the cover sheet and a harness configured for attaching to a headrest, wherein the system comprises an attachment between the harness and the pouch, the attachment configured to allow the pouch to move relative to the harness such that the pouch spans from a front surface and a rear surface of the headrest whilst the harness remains statically affixed to the headrest.

2. The system as claimed in claim 1, wherein the harness comprises a band having ends attachable together to loop over the band over the headrest.

3. The system as claimed in claim 2, wherein the band comprises a wide band portion which goes over the headrest and a narrow band portion which goes under the headrest.

4. The system as claimed in claim 2, wherein the ends have fastener pads which attach.

5. The system as claimed in claim 4, wherein the fastener pads run longitudinally along respective ends.

6. The system as claimed in claim 1, wherein the pouch comprises a cover flap and a longer backing which folds against the flap and attaches thereto to define a pocket for the cover sheet.

7. The system as claimed in claim 1, wherein the pouch comprises a purse sealed at three edges and defining an opening for the cover sheet.

8. The system as claimed in claim 1, wherein the system comprises a retainer web having a proximal end attached from the harness and a distal end attached from the pouch, the retainer web configurable to allow the pouch to flip over the headrest.

9. The system as claimed in claim 8, wherein the harness is configured to secure the proximal end of the retainer web from a top of the headrest.

10. The system as claimed in claim 9, wherein the retainer web is configured to hang the pouch across a front surface of the headrest.

11. The system as claimed in claim 9, wherein the retainer web is configured to hang the pouch across a rear surface of the headrest.

12. The system as claimed in claim 8, wherein the pouch comprises a cover flap and a longer backing which folds against the flap and attaches thereto to define a pocket for the cover sheet.

13. The system as claimed in claim 8, wherein the pouch comprises a purse sealed at three edges and defining an opening for the cover sheet a cover flap and wherein the opening is orientated downwardly when the when the pouch is across the front surface of the headrest.

14. The system as claimed in claim 1, wherein the attachment is configured to allow the pouch to slide with respect to the harness between the front and rear surfaces of the headrest.

15. The system as claimed in claim 14, wherein the attachment comprises a slider band held by the harness to extend over the headrest between front and rear surfaces thereof and wherein the pouch comprises an engagement configured to slidably engage the slider band so that the pouch can slide between the front and rear surfaces.

16. The system as claimed in claim 15, wherein a slider band is held substantially taught by the harness over the headrest between front and rear surfaces of the headrest.

17. The system as claimed in claim 1, wherein the cover sheet comprises a seat back covering portion and a seat base covering portion and wherein the cover sheet narrows between the seat back covering portion and the seat base covering portion.

18. The system as claimed in claim 1, wherein the cover sheet is removably attachable from the pouch.

19. The system as claimed in claim 18, wherein the cover sheet comprises an attachable portion comprising fastener pads which attach to corresponding fastener pads of a corresponding attachment portion of the pouch.

20. A method of covering a seat using the system as claimed in claim 1, the method comprising attaching the harness to the headrest and moving the pouch from behind the headrest to in front of the headrest using the attachment without moving or repositioning the harness.

* * * * *